United States Patent
Roberts et al.

(10) Patent No.: US 9,455,758 B1
(45) Date of Patent: Sep. 27, 2016

(54) ULTRA-LOW POWER LONG RANGE TRANSCEIVER

(71) Applicant: The Regents of The University of Michigan, Ann Arbor, MI (US)

(72) Inventors: Nathan E. Roberts, Ann Arbor, MI (US); David D. Wentzloff, Ann Arbor, MI (US); Michael Kines, Warren, OH (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 14/715,003

(22) Filed: May 18, 2015

(51) Int. Cl.
   H04B 1/38         (2015.01)
   H04B 1/3827       (2015.01)
(52) U.S. Cl.
   CPC .................... *H04B 1/3827* (2013.01)
(58) Field of Classification Search
   CPC ............ H04B 1/38; H04B 1/16; H04B 1/40; H04W 52/0209
   USPC ............................ 455/73, 84, 130, 158.3, 574
   See application file for complete search history.

(56) References Cited

U.S. PATENT DOCUMENTS

| | | | |
|---|---|---|---|
| 8,090,062 B2 * | 1/2012 | Sankabathula | H03G 3/3052 375/260 |
| 8,156,359 B1 | 4/2012 | Sedarat et al. | |
| 2007/0177694 A1 * | 8/2007 | Okunev | H04L 27/14 375/333 |
| 2009/0245430 A1 * | 10/2009 | Budianu | H03M 13/2957 375/340 |
| 2013/0331042 A1 | 12/2013 | See et al. | |
| 2013/0337758 A1 | 12/2013 | Hsieh | |
| 2014/0232207 A1 | 8/2014 | Lee et al. | |
| 2015/0063430 A1 | 3/2015 | Chang et al. | |
| 2015/0094117 A1 | 4/2015 | Conta et al. | |

FOREIGN PATENT DOCUMENTS

EP      1312189 A1    5/2003

OTHER PUBLICATIONS

Low-Power Sub-1 GHz RF Transceiver Data Sheet, CC1101, Texas Instruments, www.ti.com, Available as of May 17, 2015.

\* cited by examiner

*Primary Examiner* — Tuan Pham
(74) *Attorney, Agent, or Firm* — Harness, Dickey & Pierce, PLC (57) ABSTRACT

A low power long range transceiver is presented. The transceiver includes: an antenna configured to receive an RF signal; an analog front-end circuit configured to receive the RF signal from the antenna and pre-condition the RF signal by at least one of amplify the RF signal, shift frequency of the RF signal and filter the RF signal; and a demodulator configured to receive the preconditioned signal from the front-end circuit and an assertion trigger signal signifying an end of a predefined time period, where the demodulator, in response to the assertion trigger signal, outputs a data value for a given data bit in the RF signal. A controller is also configured to receive the assertion trigger signal and, in response to the assertion trigger signal, disables at least one component of the transceiver, thereby reducing power consumption.

18 Claims, 11 Drawing Sheets

FIG. 15

ULTRA-LOW POWER LONG RANGE TRANSCEIVER

FIELD

The present disclosure relates to design aspects of a low power long range transceiver.

BACKGROUND

Designing RF circuits for Internet of Things (IoT) applications has been focused on short range communication. There are several applications, however, where sensor nodes would benefit from having longer range, while still maintaining the qualities of the short range radios. Such a sensor node would not have the size constraint that body area networks impose and therefore more aggressive energy harvesting can be used which allows for a larger power budget. Many commercial companies are making long range communication chips for IoT including Analog Devices, Texas Instruments, and Semtech.

Long range radios would be useful in many different scenarios. A simple example would be for remote environmental sensing applications that do not require high data rates and may need to communicate once in a while. For example, Analog Devices introduced the CN0164 Low Power, Long Range ISM Wireless Measuring Node. This system consists of a low power temperature measurement node that wakes once a minute, measures the temperature, transmits the information, then returns to sleep.

However, it will be difficult to operate any of the mentioned radios off harvested energy supplies. Using the Texas Instruments CC1101 as an example, assume the average power for the sensor node is required to be 50 µW. The CC1101 can be configured to communicate at 1 kbps and consumes 48 mW in receive mode and 48 mW in transmit mode. Duty cycling to make the average power 50 µW would lead to an average data rate of only 1.04 bps, which is optimistic because it does not take into account startup time. If the sensor node has to transmit a 100-bit packet at 1 kbps then 1.6 mF of storage capacitance is required in order to prevent the supply voltage from dropping more than 1V.

This disclosure presents a long range transceiver (LRTRx) design that runs on harvested energy effectively. An average power consumption of 50 µW is achievable and the instantaneous power should be kept below 1 mW for receive and a few mW for transmit.

This section provides background information related to the present disclosure which is not necessarily prior art.

SUMMARY

This section provides a general summary of the disclosure, and is not a comprehensive disclosure of its full scope or all of its features.

A low power long range transceiver is presented. The transceiver includes: an antenna configured to receive an RF signal; an analog front-end circuit configured to receive the RF signal from the antenna and pre-condition the RF signal by at least one of amplify the RF signal, shift frequency of the RF signal and filter the RF signal; and a demodulator configured to receive the preconditioned signal from the front-end circuit and an assertion trigger signal signifying an end of a predefined time period, where the demodulator, in response to the assertion trigger signal, outputs a data value for a given data bit in the RF signal.

A controller is also configured to receive the assertion trigger signal and, in response to the assertion trigger signal, disables at least one component of the transceiver, thereby reducing power consumption. The controller is further configured, in response to a de-assertion trigger signal, enables the at least one component, where the de-assertion trigger signal occurs after the assertion signal and before an end of the given data bit.

The analog front-end circuit includes a low noise amplifier and a mixer circuit. The low noise amplifier is configured to receive the RF signal from the antenna and amplify the RF signal. The mixer circuit is configured to receive the amplified RF signal from the low noise amplifier and operates to shift the amplified RF signal to an intermediate signal having a different frequency. A phase-locked loop circuit is operably coupled with the mixer circuit. The phase-locked loop circuit includes a phase frequency detector, a charge pump circuit, a voltage-controlled oscillator and a frequency divider. The controller, in response to the assertion trigger signal, powers down the low noise amplifier, disables the phase frequency detector and powers down buffers and dividers of the voltage-controlled oscillator, such that the low noise amplifier is powered down before the phase frequency detector is disabled and the phase frequency detector is disabled before the buffers and dividers are powered down.

In another aspect of this disclosure, the demodulator, during the predefined time period, operates to count transitions between a high value and a low value in the intermediate signal and outputs the data value for the given data bit in accordance with the number of transitions counted for the given data bit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In order to improve upon what is commercially available, the first goal is to understand what is possible. Power reduction will come from data rate, bandwidth, and duty cycling. Using Shannon's classic communication capacity theorem, shown in Equation 1, a first-order calculation of the power requirements for kilometer range communication can be analyzed.

$$R_b < BW \cdot \log_2\left(1 + \frac{P_{RX}}{N_0 BW}\right) \quad (1)$$

Shannon states that the data rate ($R_b$) is a tradeoff between the bandwidth (BW), the received signal power ($P_{RX}$), and the noise spectral density ($N_0$). Equation 2 below shows the same formula, but written with respect to transmitted energy.

$$\frac{E_b}{N_0} > \frac{2^{R_b/BW} - 1}{R_b/BW} \quad (2)$$

where $E_b$ is the energy per transmitted bit.

To find the optimal data rate and bandwidth for our application, a link budget is calculated that makes the following assumptions: the communication distance is 1 kilometer, the frequency of operation is the 433 MHz ISM band, the efficiency between circuit power and power radiated at the antenna is 10%, and the noise figure (NF) of the receiver is 15 dB. Looking at Shannon's theorem from a hardware perspective, it can be said that the energy per bit to noise ratio ($E_b N_0$) for the transmitter subtracted by the path loss through the air and the $E_b N_0$ of the receiver must be greater than 0, as shown in Equation 3 and in more detail in Equation 4:

$$\frac{E_b}{N_{0_{Tx}}} - P_L - \frac{E_b}{N_{0_{Rx}}} > 0 \quad (3)$$

$$(pwr * T_b) - N_0 - 20 \cdot \log_{10}\left(\frac{4\pi f}{c}\right) - 20 \cdot \log_{10}(1km) - \frac{2^{R_b/BW} - 1}{R_b/BW} > 0 \quad (4)$$

Figure 1A:
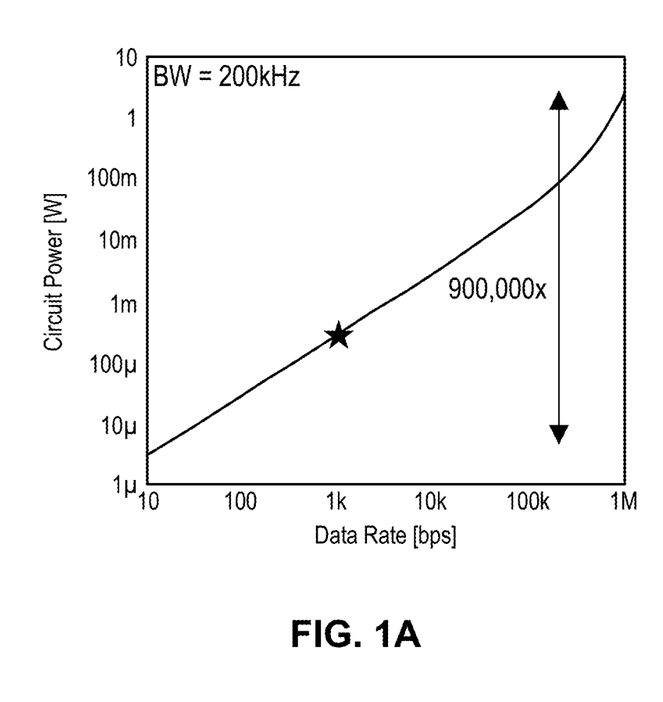
FIGS. 1A and 1B are graphs illustrating impact of data rate and bandwidth, respectively, on circuit power for kilometer range communications.
Figure 1B:
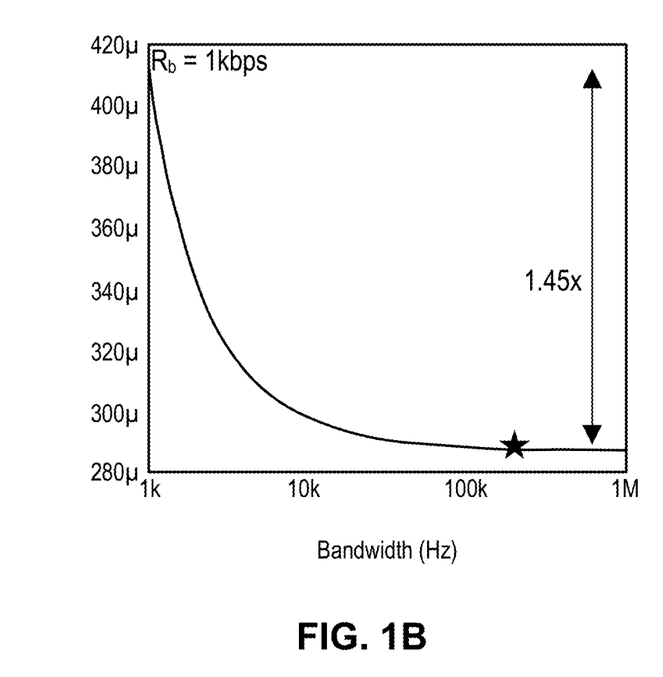

With reference to FIGS. 1A and 1B, the data rate ($R_b$) has a much more significant impact than bandwidth (BW) on circuit power. In order to keep the circuit power in the sub-mW range while keeping the bandwidth low enough for multiple channels within the 433 MHz ISM band, it was found that optimal specs for power and application performance is a 1 kbps data rate and a 200 kHz bandwidth, which is ⅛ of the 433 MHz ISM channel bandwidth, providing the opportunity for multiple channels. Duty cycling will be utilized so the circuit can operate off harvested energy, but will lower the effective data rate by the rate the duty cycling is applied.

Reducing data rate in an effort to increase communication range is an intuitive tradeoff because it increases the signal energy per bit which directly improves the receiver's ability to detect the transmitted signal. More signal energy improves the signal's energy per bit to noise ratio ($E_b N_0$) which will result in an improved sensitivity metric in the receiver as seen in FIG. 2.

At sensitivity levels from −70 dBm and to the left, there is a correlation showing that a 10 dBm change in sensitivity results in about a 10× change in data rate, which makes sense because the faster data rate has less energy per bit that can be detected at the receiver. There is an empirical limit, this time at −70 dBm, where the energy per bit is high enough that other factors dominate the data rate performance. This shows that low power radios are generally good for sub-1 Mb/s data rates. Looking at the type of modulations listed, it also shows that FSK is the most consistent modulation for excellent sensitivity and trades off well with data rate.

Figure 2:
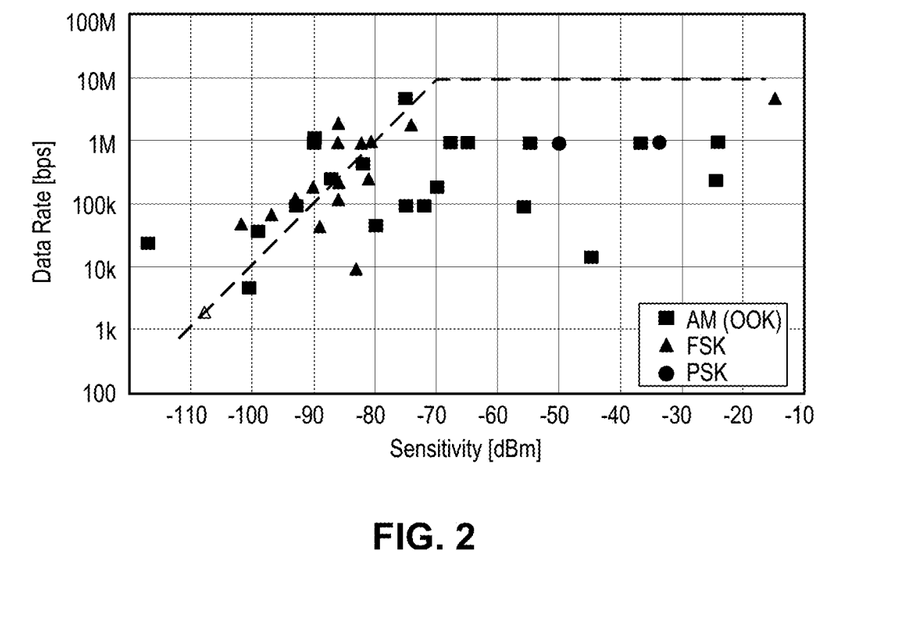
FIG. 2 is a graph plotting data rate versus sensitivity for different modulation schemes.
Figure 3:
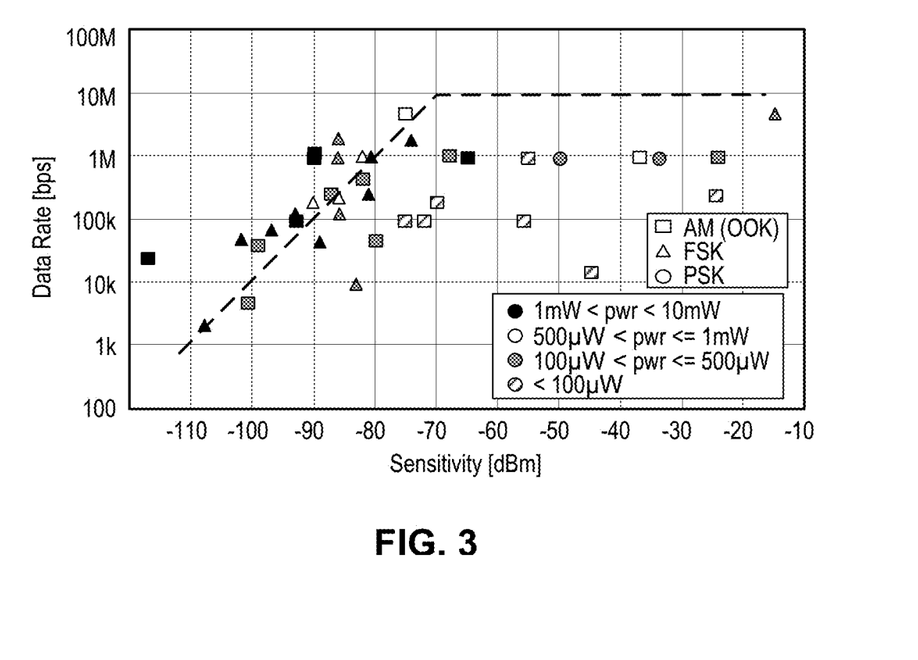
FIG. 3 is a graph plotting data rate versus sensitivity and power for different modulation schemes.

FIG. 3 shows the same data as FIG. 2, but with power included via shading of the data point. Looking at sensitivity from −70 dBm and to the left, where there is a 10 dB sensitivity to 10× power correlation, the majority of data points along the fit line are FSK and OOK modulation radios, but the FSK-modulated radios in general consume much less power.

Figure 4:
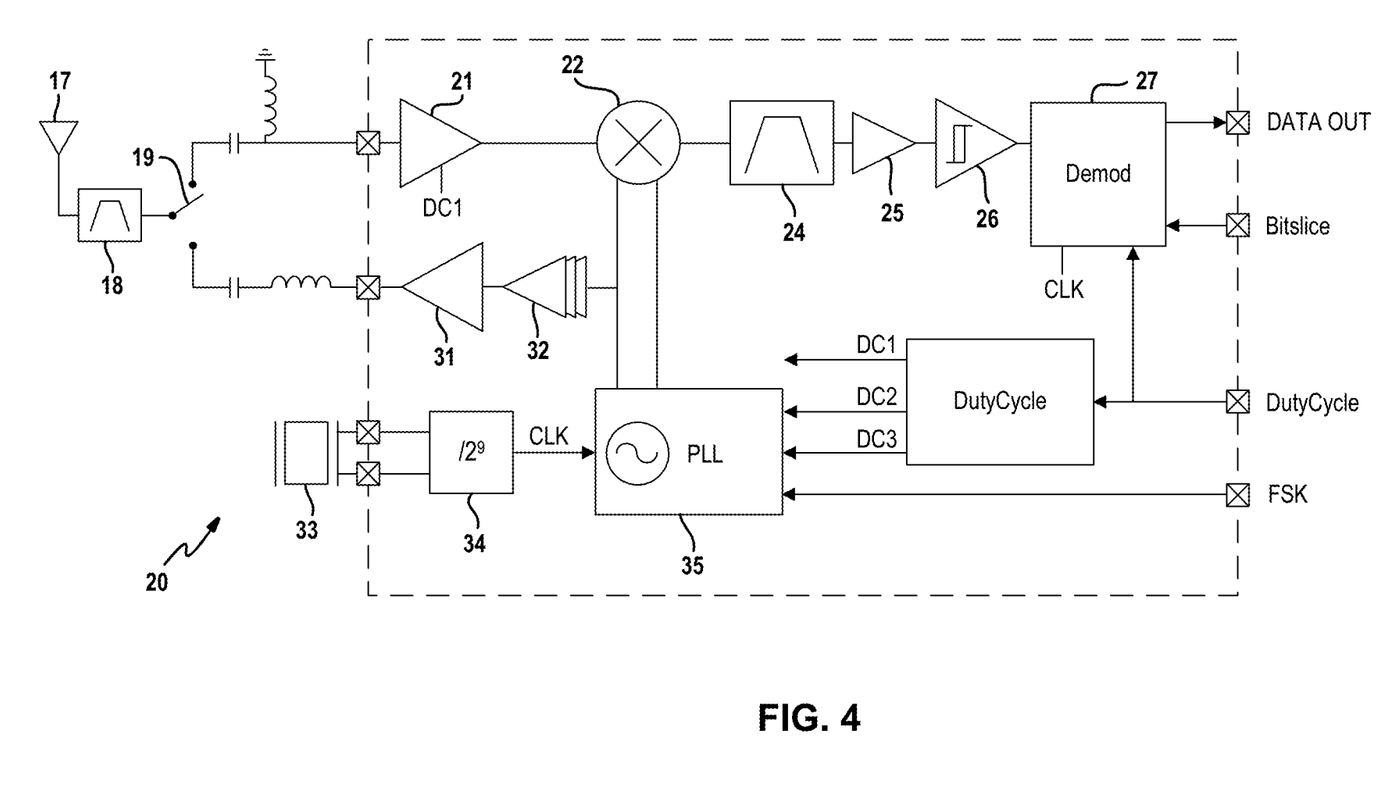
FIG. 4 is a block diagram of an example embodiment of a low power long range transceiver.

FIG. 4 depicts an example system architecture for a low power long range transceiver 20. The receive portion of the transceiver 20 is comprised of an analog front-end circuit configured to receive the RF signal from the antenna 17 and pre-condition the RF signal, for example by one or more of amplify the RF signal, shift frequency of the RF signal and/or filter the RF signal. In the example embodiment, the analog front-end circuit includes a single-ended common source cascoded low noise amplifier (LNA) 21 with a passive mixer 22. Output from the mixer goes into an intermediate frequency (IF) stage 24 (i.e., transimpedance amplifier) to improve linearity. In the example embodiment, the IF stage 24 contains a $6^{th}$ order gm-C filter which provides gain and channel selection and is followed by another gain stage 25. The signal is then squared up with a comparator 26 and driven into a small baseband processor (demodulator) 27 which uses the IF frequency as a counter and determines the bit value based on the number of counts in a certain bit slice. Bit slicing and synchronization is controlled through an off-chip controller (e.g., a FPGA) as will be further described below. In scenarios with sufficient SNR margin and low enough data rate, bit-level duty cycling is possible to reduce transmit and receive power and is also controlled from the off-chip controller. Other arrangements for the receive portion of the transceiver also fall within the broader aspects of this disclosure.

In the transmitter portion, an example embodiment may include a power amplifier 31 and buffers 32. The Class-E power amplifier 31 runs off a 0.5V supply, but is clocked using buffers 32 running at 1.2V. The larger supply on the buffers 32 increases their drive strength, allowing them to clock the large power amplifier switch more efficiently, improving overall efficiency in the transmitter. Other arrangements for the transmitter portion of the transceiver also fall within the broader aspects of this disclosure.

In the example embodiment, an off-chip 26 MHz crystal 33 with on-chip oscillator 34 is used as a reference clock.

Because the transceiver does not use a fast clock for power saving purposes, the 26 MHz signal is immediately divided by $2^9$ to establish a reference frequency of 50.78 kHz for the phase-locked loop circuit (PLL) 35 providing the LO signal. In the example embodiment, the reference frequency divider is made up of nine cascaded D-FFs and the output of the last D-FF enables a final D-FF stage which is clocked by the 26 MHz crystal, eliminating the accumulated jitter from the previous nine stages.

Dividing down the 26 MHz reference clock is a design decision that will trade-off PLL settling time and power. This decision will put an upper limit on the data rate possible for bit-level duty cycling. If the required data rate is higher than the upper limit then only packet-level duty cycling will be possible. It is readily understood that the reference clock may operate at other frequencies within the scope of this disclosure.

Transmission consumes mA of current and receiving consumes hundreds of µA, which are relatively high power for harvested energy circuits. Storing energy on a bank of off-chip capacitors, about 1-2 µF is required for every bit transmitted if the power management can only allow for a 1V drop on the supply.

In the example embodiment, the transceiver 20 specifications were chosen to make it operable with the TI CC1101. The Texas Instruments CC1101 is a sub-GHz transceiver designed specifically for long range and low power applications, intended mainly for the ISM band, and is a commercial chip that closely resembles the design goals of the proposed transceiver 20. The transceiver was designed to be compatible with the CC1101 under the following configuration settings in Table 1 as follows:

TABLE 1

CC1101 Long Range, Low Power Transceiver Configuration

| Specification | Value | Unit |
|---|---|---|
| Frequency | 433 | MHz |
| Modulation | 2-FSK | |
| Data Rate | 1001.2 | Baud |
| Channel BW | 203.125 | kHz |
| FSK Frequency Deviation | 50.781 | kHz |
| IF Frequency | 863.281 | kHz |

The 433 MHz band has a 1.74 MHz total channel bandwidth so the transceiver will have 8 total channels and these values line up closely with the theoretical values computed above. These values were calculated from the CC1101 datasheet. The low power CC1101 consumes 16.0 mA in receive mode at 433 MHz at 1.2 kbaud with register settings set to reduced current and the input signal at the sensitivity limit of the receiver, as stated by the datasheet. The transmitter consumes 16.0 mA when outputting 0dBm at 433 MHz. VDD is 3.0V, bringing the total power for transmit and receive to 48 mW each. The link budget for the transceiver 20 is shown in Table 2 below Table 2 which computes the required receiver sensitivity and noise figure to achieve kilometer range communication.

TABLE 2

LRTRx Link Budget

| Spec | Value | Unit |
|---|---|---|
| Center Frequency | 433 | MHz |
| Data Rate | 1001.2 | bps |
| Bandwidth | 203.125 | kHz |
| Distance | 1000 | Meters |
| Transmit Power | 0 | dBm |
| Path Loss | 85.18 | dB |
| Antenna Gain | 0 | dB |
| Noise Power | −143.99 | dBm |
| Min. Eb/No | 12 | dB |
| Link Margin | 10 | dB |
| Receive Sensitivity | −85.18 | dBm |
| Receiver Noise Figure | 36.81 | dBm |

The difference between the link budget and the previous capacity calculation is that power between transmit and receive must be reasonable based on hardware constraints. Reducing the output power of a power amplifier only works as long as the increased sensitivity burden placed on the receiver is reasonable and does not dramatically change the overall receiver power. And since the receiver spends much of its time in the active state listening for packets, low receiver power is critical to the overall system design. Setting the transmit power to 0dBm sets the receiver's required sensitivity to be −85 dBm for kilometer range communication. While the transmitter's power will be high, greater than 1 mW, the receiver's power will be in the µW range. Communicating with the CC1101, with its potential +10 dBm transmit output power and −112 dBm receive sensitivity should enable kilometer range communication with 10 dB design margin on the receiver sensitivity and about 25 dB design margin for the transmitter.

Figure 5:
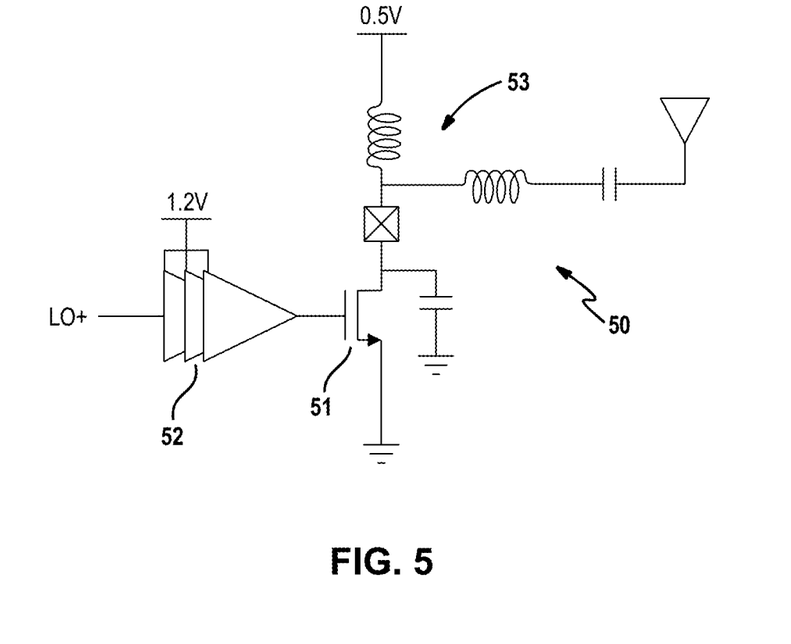
FIG. 5 is a schematic of an example transmitter.

FIG. 5 further depicts an example implementation for the transmitter 50. The transmitter 50 includes a Class-E power amplifier 51 operating at 0.5V preceded by a 4 stage clock buffer 52 created with standard cells. 2-FSK modulation is achieved from the PLL providing the LO signal. The Class-E NMOS switch is open drain connected and the RF choke and matching network passives 53 are off-chip, again due to the size of the passives as a result of the 433 MHz RF frequency.

Figure 6:
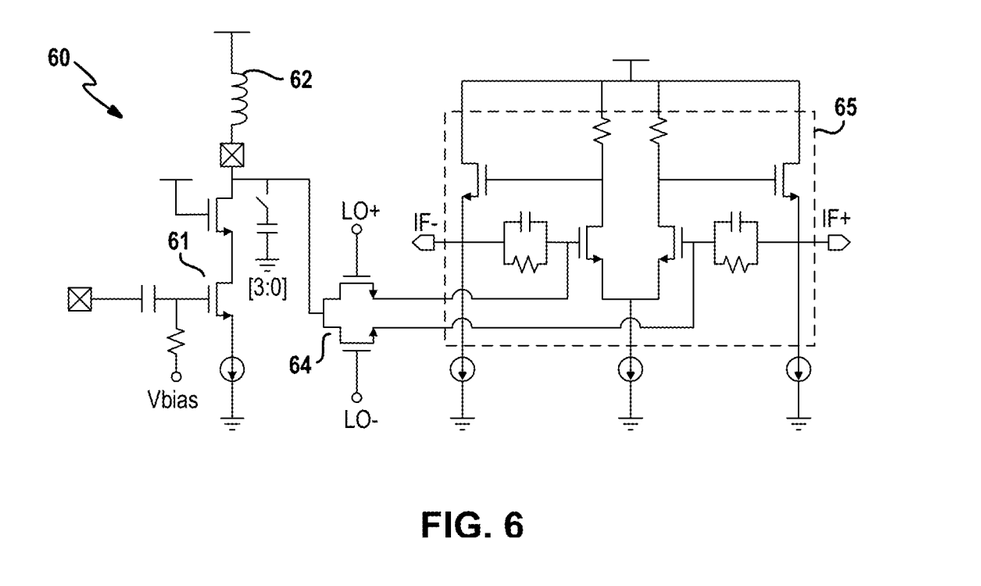
FIG. 6 is a schematic of an example of an RF front-end.

FIG. 6 further depicts an example implementation for the RF front-end 60. The RF front-end 60 includes a 433 MHz antenna 17 followed by a SAW filter 18 and an off-chip RF switch 19 as seen in FIG. 4. The RF switch 19 allows for the use of independent off-chip matching networks for both the power amplifier (PA) 31 and the LNA 21. On-chip the LNA 21 can be an AC-coupled single-ended cascode amplifier 61 with a tunable current source. Because of the relatively low RF frequency, an off-chip inductor 62 load is used and resonates with an on-chip switchable cap bank.

The mixer 64 consists of a single-balanced passive switching stage which is controlled by the differential square wave output from the PLL 35. The output from the single balanced mixing goes into a transimpedance amplifier (TIA) 65 to improve linearity and provide gain. Other implementations for the RF front-end also contemplated by this disclosure.

Figure 7:
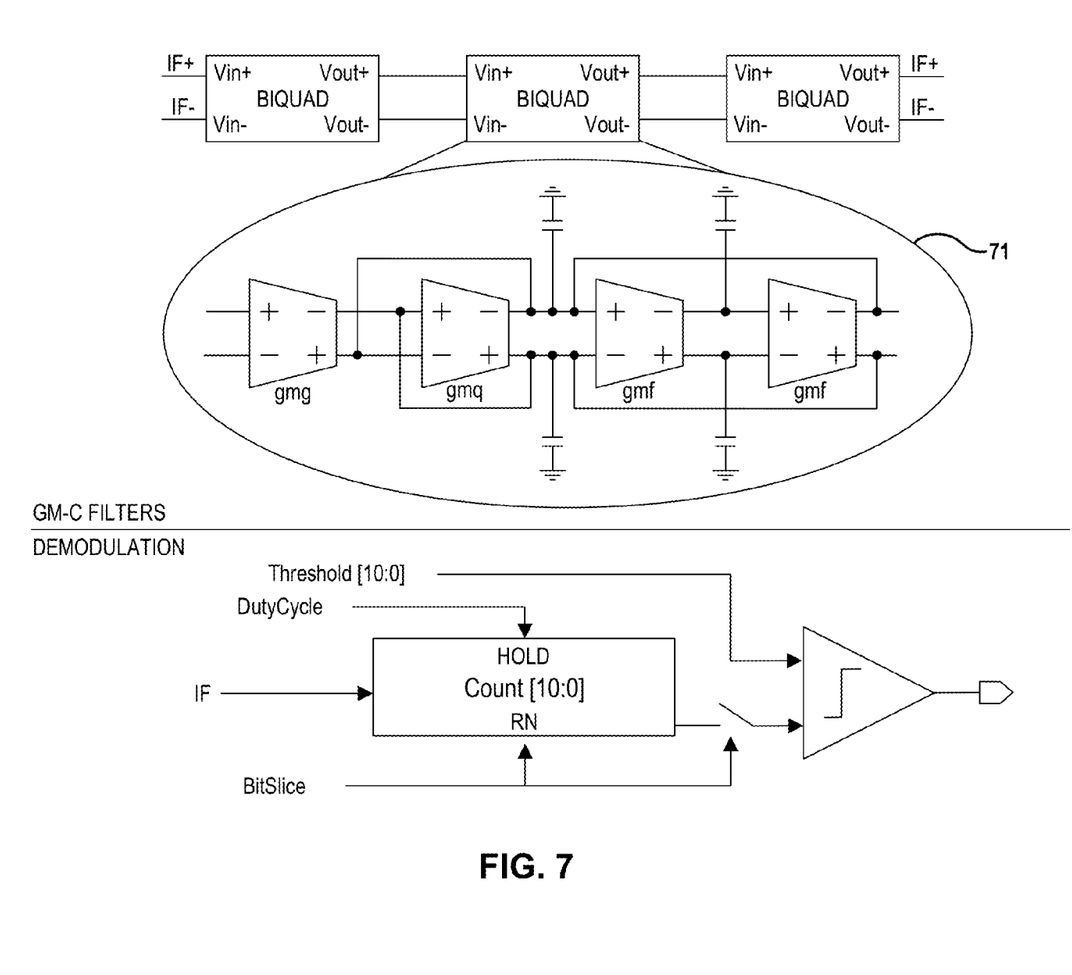
FIG. 7 is a diagram of an example filter and demodulator.

With reference to FIG. 7, the IF stage is further described. Following the mixing operation, the signal is filtered by a 6-order $g_m$-C filter 71. In an example embodiment, the filter has a channel bandwidth of 200 kHz and provides 20-40 dB of programmable gain. Following the $g_m$-C filter is another gain stage 25 and a comparator 26 with tunable hysteresis for noise resilience as seen in FIG. 4.

Figure 9:
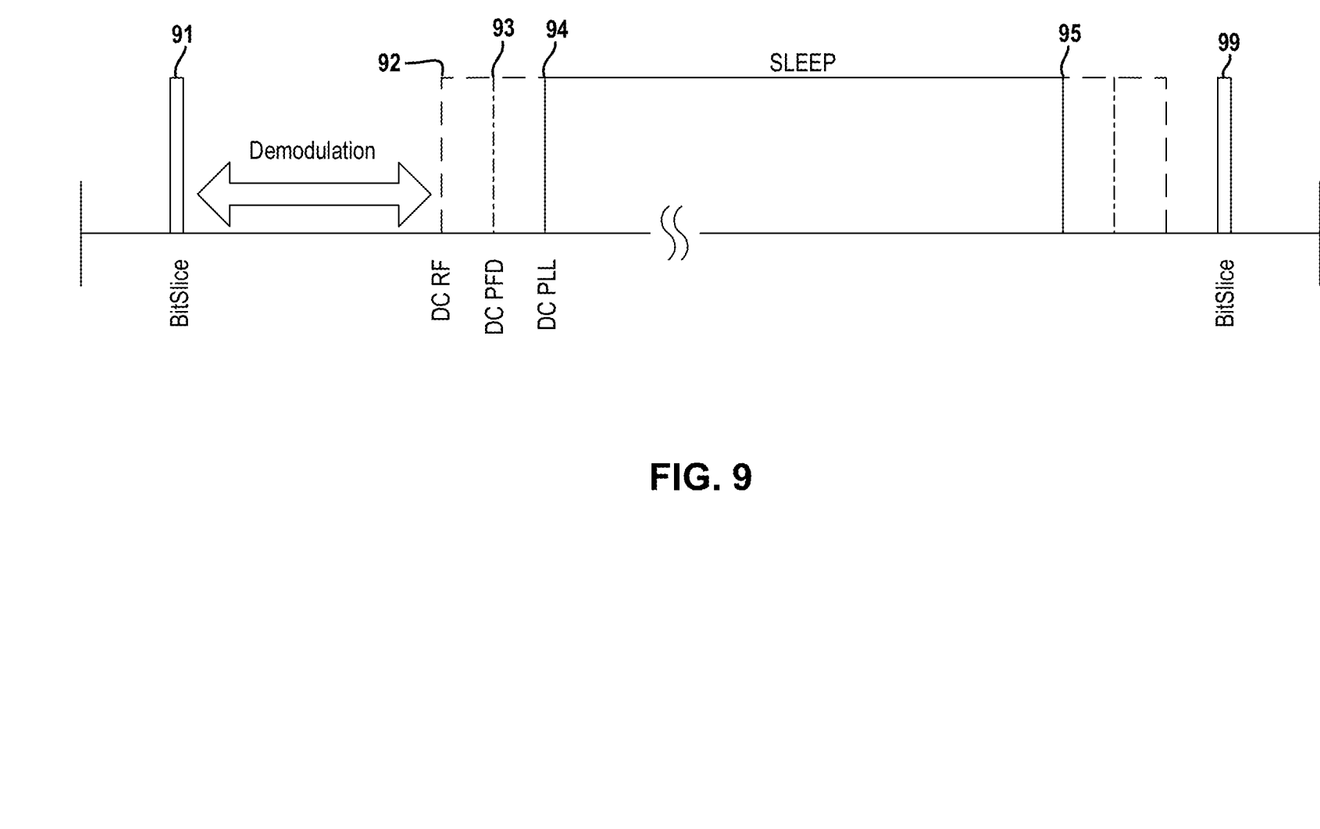
FIG. 9 is a diagram illustrating bit-level duty cycling in the transceiver.

The demodulator 27 is configured to receive the intermediate signal from the comparator 26. In operation, the demodulator determines a value for the data bit in accordance with a number of transitions counted for a given data bit. More specifically, the intermediate signal clocks a counter in between bit slice pulses 91, 99 as seen in FIG. 9. In response to a bit slice pulse signifying an end of the data bit, the demodulator compares the count with a predefined threshold. The data bit is assigned a value of one when the count exceeds the threshold and is assigned a value of zero when the count is less (or equal) than the threshold. For example, if the bit rate is 1 kbps, then the bit slice time is 1 ms. With an IF frequency of 863 MHz and a 2-FSK frequency deviation of 50.78 kHz, a transmitted 0 would have a count of about 813 and a 1 would have a count of 913. Setting the threshold at the center of the IF frequency would put it at 863 and provide a count buffer of 50 counts before a bit error would be made. In this way, the demodulator outputs a value for each data bit.

In an environment with good SNR, bit-level duty cycling can be employed to save power. Bit-level duty cycling demodulates the intermediate signal for only a portion of the duration of the data bit as shown in FIG. 9. In the case of a 20% duty cycle, the intermediate signal is demodulated for a predefined time period (on the order of ⅕ the bit slice time). In response to an assertion trigger signal signifying the end of the predefined time period, the demodulator outputs a value for the given data bit. The value for the data bit is computed in the manner described above with the threshold being adjusted proportionally in relation to the duty cycle. Continuing with the example above, the threshold may be set at 173 for a 20% duty cycle.

Once the value of the data bit has been determined and output by the demodulator, one or more components of the transceiver may be powered down or otherwise disabled to reduce power consumption. In the example embodiment, the low noise amplifier 21 is first powered down at 92. Next, the phase frequency detector of the PLL is disabled at 93 so that no Up/Dn pulses are triggered. Lastly, the buffers and dividers of the voltage-controlled oscillator are powered down at 94. The sequence can be completed over three consecutive clock cycles. Because the reference frequency to the PLL is so low and the PLL's startup time is slow, the charge pump stays on to maintain the VCO's tuning state. This sequence is merely exemplary and it is readily understood that more or less or different components can be powered down or otherwise disabled Prior to the end of the data bit, a de-assert trigger signal is issued as indicated 95. In response to the de-assert trigger signal, the receiver components are woken up, for example in the reverse order. That is, the buffers and dividers are powered up, followed by the enablement of the phase frequency detector and then the powering up of the LNA. Since the VCO will be close in frequency, but not in phase, there will be a necessary time to lock, but that time will be faster than the original startup time of the PLL. In the example embodiment, the power down and power up sequence are controlled by an off-chip controller (e.g., a FPGA). It is noted that the demodulator remains inactive during the sequence and until the next bit slice is asserted at 99. The process is repeated for each data bit in the incoming RF signal.

Figure 10:
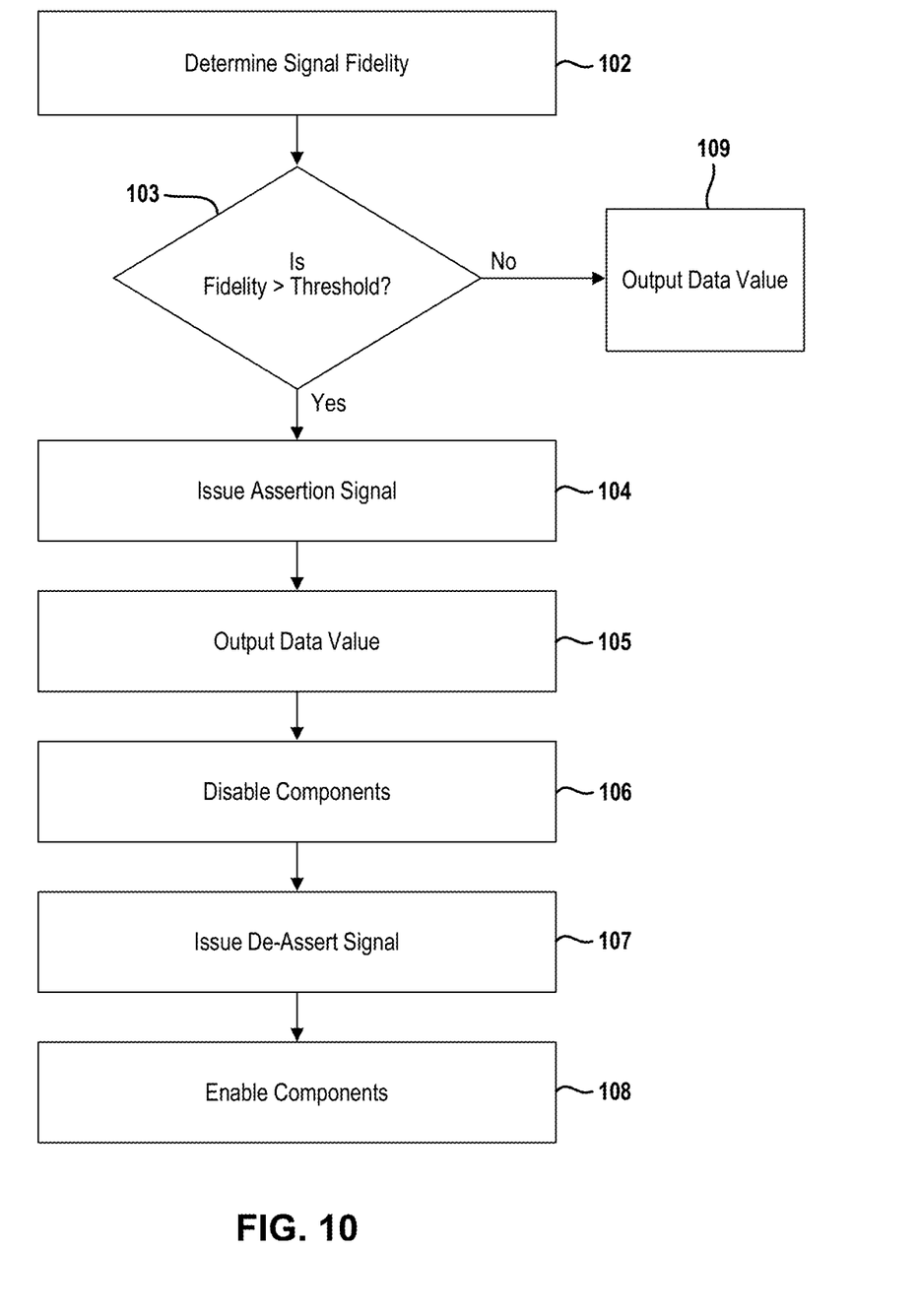
FIG. 10 is a flowchart depicting a method for operating the transceiver in accordance with an aspect of this disclosure.

Timing of the assertion trigger signal is controlled by the controller as further described in relation to FIG. 10. Fidelity of the incoming RF signal is periodically determined at 102 periodically by the controller. Example measures of signal fidelity include received signal strength, link quality indicator and bit error rate. Other types of measures are also contemplated by this disclosure.

The fidelity measure is then compared at 103 to a minimum quality threshold. When the fidelity measure is less than or equal to the minimum quality threshold, incoming data is demodulated in the conventional manner. That is, the demodulator outputs data value for the current data bit at the end of the bit slice as indicated at 109.

When the fidelity measure exceeds the minimum quality threshold, bit-level duty cycling can be employed as noted above to save power. Specifically, an assertion trigger signal is issued at 104 at a predefined time period after the beginning of the current bit slice by the controller. The duration of the predefined time period is preferably less than direction of a symbol time in the RF signal. In an example embodiment, the predefined time period is set as a function of the difference between the fidelity measure and the minimum quality threshold. For example, the larger the difference (i.e., higher signal quality), shorter the predefined time period. Conversely, the smaller the difference (lower signal quality), longer the predefined time period. In one embodiment, the assertion trigger signal is a pulse-width modulated signal and the pulse is modulated according to the difference between the fidelity measure and the minimum quality threshold. It is envisioned that the function for setting value of the predefined time period may be a linear or non-linear as well as depend on other setting in the wireless transceiver.

In response to the assertion trigger signal, the demodulator outputs a data value for a given data bit in the RF signal as indicated at 105. The value for the data bit is computed in the manner described above with the threshold being adjusted proportionally in relation to the duration of the predefined time period (i.e., its duty cycle). In response to the assertion trigger signal, the controller also disables one or more components of the transceiver at 106 in order to save power.

Prior to the end of the data bit, a de-assert trigger signal is issued at 107 by the controller. In response to the de-assert trigger signal, the one or more components are re-enabled as indicated 108. This process can be repeated for each data bit in the incoming RF signal. It is to be understood that only the relevant steps of the methodology are discussed in relation to FIG. 10, but that other steps are needed to control and manage the overall operation of the transceiver.

Figure 8:
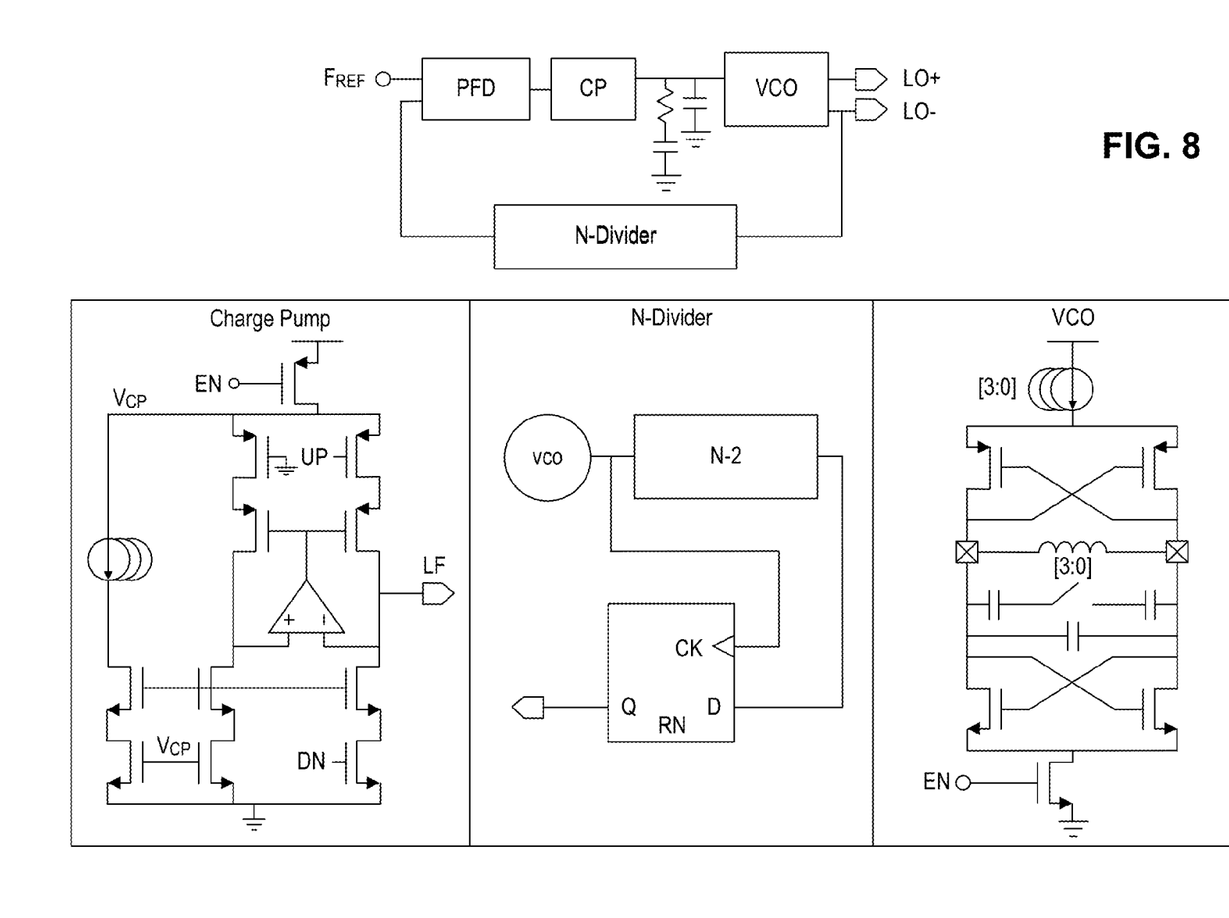
FIG. 8 is a schematic of an example phase locked loop circuit.

A charge pump-based PLL was designed to act as the LO for the entire system. FIG. 8 shows the architecture of an example of the main circuits comprising the PLL 35. Running off the divided down 26 MHz crystal oscillator, the reference frequency for the PLL is 50.78 kHz, the same frequency as the 2-FSK deviation specifies, allowing for integer-N division. Because the divide value between the reference frequency and the −433 MHz output frequency is so large, the same technique that is applied to the crystal oscillator divider is applied to the PLL's divider, namely that it counts up to N−2 (1 clock cycle to remove accumulated jitter and another clock cycle for resetting the counter) and then the Nth clock is directly clocked by the VCO which removes the accumulated jitter from the rest of the divider chain. In addition a 2-bit FSK value is controlled from an off-chip FPGA and is added to the user programmable divide value. This allows for effective 2-FSK modulation. The programmable N−2 divider allows the transceiver to frequency hop between the specified 8 different physical channels in the 433 MHz ISM band.

Figure 11:
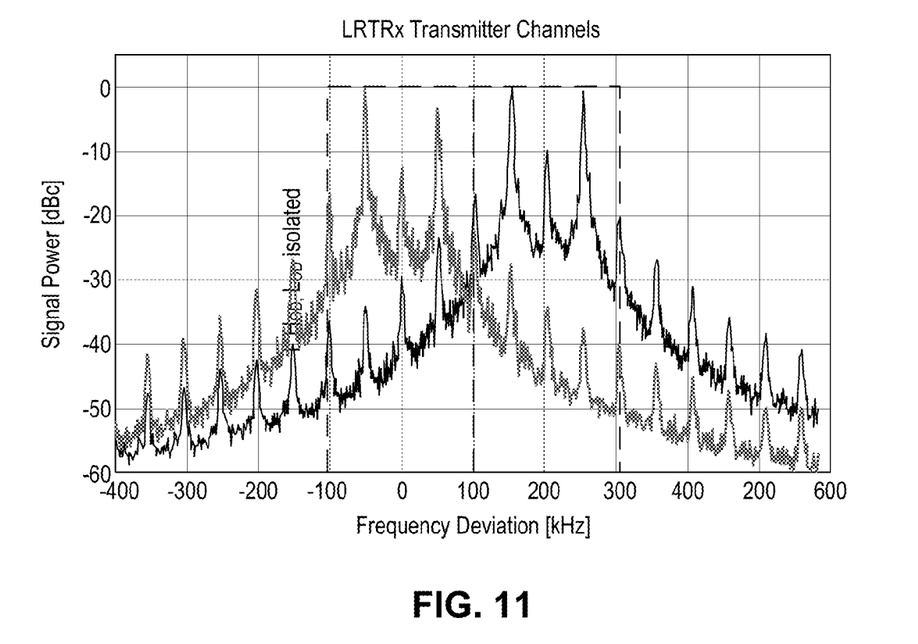
FIG. 11 is a graph depicting the spectrum output of two adjacent channels.

The power amplifier was measured to have a 0.04 dBm output power with a PAE of 47.49%. Total power on the supply for the PA is 2.13 mA and the PLL and clock buffer consume 266 μW and 180 μW, respectively. FIG. 11 shows the spectrum output of two adjacent channels both modulating a 1010 data pattern at 1 kbps next to each other. A drawback from choosing the lower power integer-N PLL with a slow reference frequency is the location of spurs in the frequency regions of interest. Even so, adjacent channels see a −16.7 dB dropoff. Thick oxide headers were used on the clock buffer to save sleep power, but not on the PA to maintain efficiency.

Figure 12:
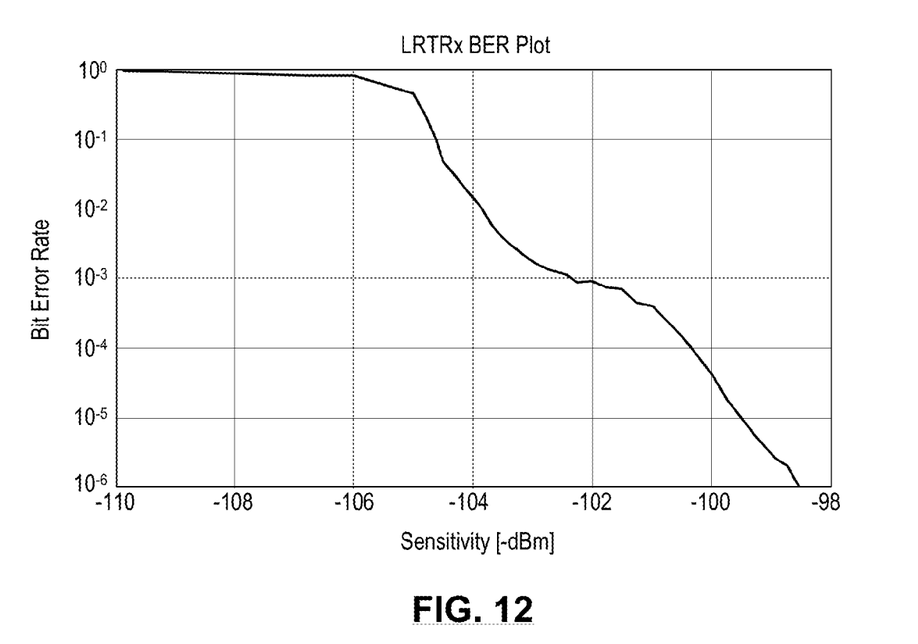
FIG. 12 is a graph depicting bit error rate in relation to the sensitivity of the transceiver.
Figure 13:
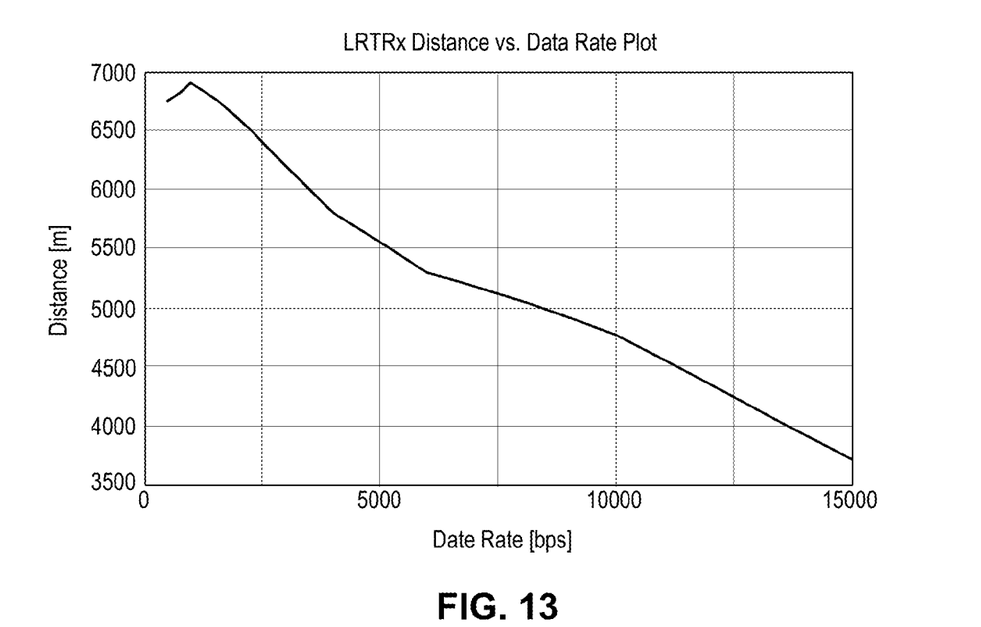
FIG. 13 is a graph depicting how the data rate can be traded based on the range of the transceiver.

The receiver has a total power consumption of 370 μW. All circuits have thick oxide headers to reduce sleep power. The receiver's sensitivity of −102.5 dBm is measured at a BER of $10^{-3}$, as shown in FIG. 12. Assuming an antenna gain of 0 dB, the theoretical communication range for chip to chip communication is greater than 5 kilometers based on the Friis free space path loss equation. Communicating transceiver to CC1101 extends that range to over 20 kilometers, well beyond the design spec. In addition, FIG. 13 shows how speed and data rate can be traded based on the required range of the application and the SNR of the surrounding environment.

Figure 14:
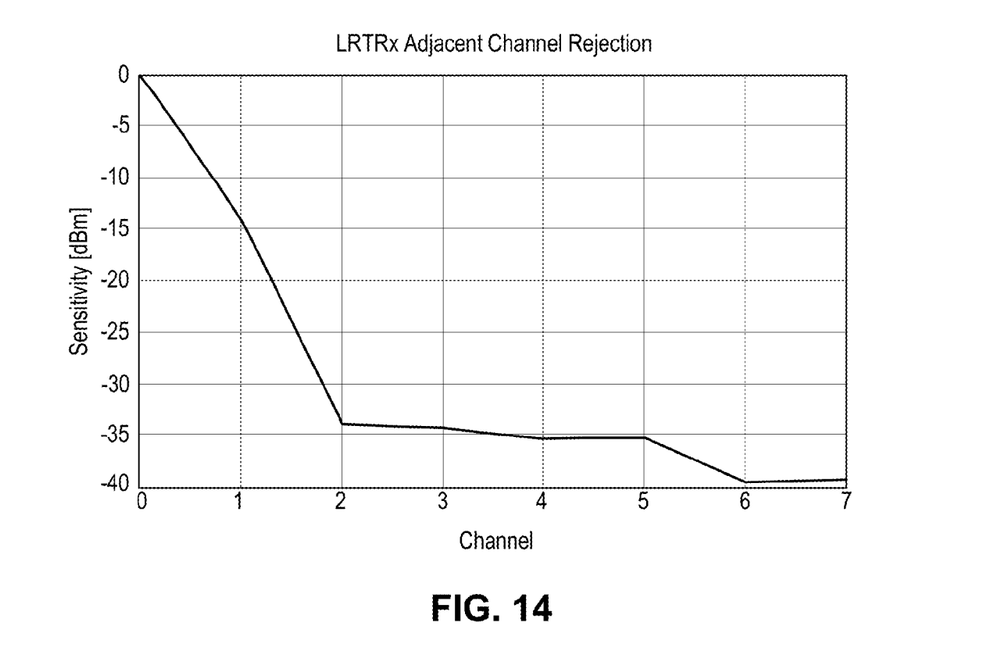
FIG. 14 is a graph depicting adjacent channel rejection across all channels.

FIG. 14 shows adjacent channel rejection across all channels. In the next adjacent channel, channel rejection is measured to be 14 dB and two channels over is measured to be 34 dB. Adjacent channel rejection was measured by setting the desired signal power so that the BER was $10^{-4}$. An interfering signal was placed in the FSK0 position (worst case frequency of the adjacent channels) and its signal power was swept until the BER fell to $10^{-3}$. Channel 0 was the reference channel.

Figure 15:
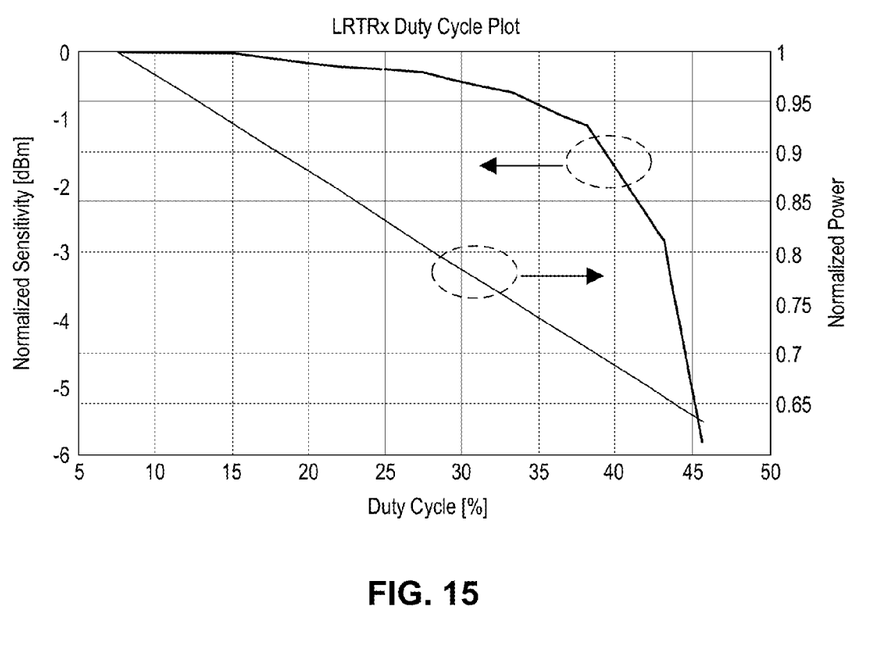
FIG. 15 is a graph depicting the sensitivity and power trade-off depending on the duty cycling of the transceiver.

Bit-level duty cycling can be employed if the required data rate is very slow. FIG. 15 shows the sensitivity vs. power trade-off based on the percentage of time during each bit window that the receiver is asleep. Sensitivity and power are both normalized to the receiver performance without duty cycling. Due to the slow lock time of the integer-N PLL bit-level duty cycling only works on data rates less than 500 bps.

For data rates above 500 bps, packet-level duty cycling is employed. The PLL startup time dictates the startup time of the entire receiver and is measured to be 0.6 bits. This makes sending packets of 100 or more bits very efficient because the startup time per packet is less than 1 bit.

Table 3 below shows a power breakdown for the LRTRx. The crystal oscillator (XO) and PLL are shared between both the transmitter and receiver and consume 31 μW and 226 μW respectively. On the receive side, the LNA and mixer consume just under 100 μW while the IF gain and filtering stages plus the digital demodulation block consume 22 μW. On the transmitter side, the power amplifier consumes 2.13 mW in order to produce almost exactly 1 mW output power at the antenna. The standard cell clock buffer consumes 182 μW. Thick oxide sleep headers were used through the design to reduce sleep power, even at the expense of active power, with the one exception being the PA in an effort to optimize efficiency. The entire receiver has a sleep power of 10.2 nW and the transmitter has a sleep power of 98.9 nW, with 93 nW of that coming from the PA. However, this can be reduced since an LDO or some other power management circuit will be used to regulate a 0.5V supply off the 1.2V supply. Disabling the power management circuit will have the same effect as a header would and will reduce the measured transmitter sleep power.

TABLE 3

LRTRx Power Breakdown Power Consumption

| Rx | | Tx | |
|---|---|---|---|
| LNA + Mixer | 99 μW | Power Amplifier | 2.13 mW |
| IF + Demodulation | 22 μW | Clock Buffer | 182 μW |
| PLL | 226 μW | PLL | 226 μW |
| XO | 31 μW | XO | 31 μW |
| TOTAL | 378 μW | TOTAL | 2.57 mW |
| SLEEP | 10.2 nW | SLEEP | 98.9 nW |

Based on the power measurements, packet-level duty cycling can be analyzed. Measured startup time from sleep to receiving data is on average 3 ms, or 3 bits and the turn-off time is less than 1 bit. The power between packets is measured to be 10.2 nW for the receiver and 99 nW for the transmitter. Returning to the examples provided earlier, assume the application requires a temperature measurement be sent once a minute and it is a 100-bit packet. Turn on and off time increase that length to 104 packets which is 104 ms every minute. The power averaged over a minute would then be 4.55 μW for transmission and 665 nW for receive. The transmitter can send 11 packets per minute, or 1100 bits, and stay within the target 50 μW average power budget. The receiver can actively listen for nearly 8 seconds out of every minute to stay within the 50 μW power budget.

A hypothetical scenario was discussed using a CC1101 in which a 100-bit packet is communicated at 1 kbps. To run off harvested energy this resulted in 1.6 mF of storage caps per packet and would require an average data rate of 1.04 bps to bring the overall average power consumption down to 50 μW. Under the same conditions the LRTRx in receive mode will be able to receive an average 145 bps and in transmit mode will be able to send 20 bps. The LRTRx in Rx mode can send a packet using 28.7 uF of storage cap while that increases to 120 uF for Tx mode.

Increasing the average bit rate 20× for the transmitter and 145× for the receiver enables wireless sensor nodes to communicate more information over kilometer ranges. In addition, the lower instantaneous power consumption reduces the amount of storage capacitance needed which eases the design burden and allows energy harvesters to charge the node quicker. Bit-level duty cycling increases these improvements. In addition, the LRTRx demonstrates interoperability by being designed so that it can communicate with an existing commercial TI CC1101 radio.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A low power long range transceiver, comprising:
an antenna configured to receive an RF signal;
an analog front-end circuit configured to receive the RF signal from the antenna and pre-condition the RF signal by at least one of amplify the RF signal, shift frequency of the RF signal and filter the RF signal;

a demodulator configured to receive the preconditioned signal from the analog front-end circuit and an assertion trigger signal signifying an end of a predefined time period, wherein the demodulator, in response to the assertion trigger signal, outputs a data value for a given data bit in the RF signal, where the predefined time period is less than a duration of symbol time in the RF signal; and a controller configured to receive the assertion trigger signal and, in response to the assertion trigger signal, disables at least one component of the transceiver, thereby reducing power consumption.

2. The long range transceiver of claim 1 wherein the controller, in response to a de-assertion trigger signal, enables the at least one component, where the de-assertion trigger signal occurs after the assertion signal and before an end of the given data bit.

3. The long range transceiver of claim 1 wherein analog front-end circuit includes a low noise amplifier configured to receive the RF signal from the antenna and operates to amplify the RF signal; and a mixer circuit configured to receive the amplified RF signal from the low noise amplifier and operates to shift the amplified RF signal to an intermediate signal having a different frequency.

4. The long range transceiver of claim 3 further comprises a phase-locked loop circuit operably coupled with the mixer circuit.

5. The long range transceiver of claim 4 wherein the phase-locked loop circuit includes a phase frequency detector, a charge pump circuit, a voltage-controlled oscillator and a frequency divider.

6. The long range transceiver of claim 5 wherein the controller, in response to the assertion trigger signal, powers down the low noise amplifier, disables the phase frequency detector and powers down buffers and dividers of the voltage-controlled oscillator, such that the low noise amplifier is powered down before the phase frequency detector is disabled and the phase frequency detector is disabled before the buffers and dividers are powered down.

7. The long range transceiver of claim 6 wherein the controller, in response to the de-assertion trigger signal, powers up the buffer and dividers of the voltage-controller oscillator, enables the phase frequency detector and powers up the low noise amplifier.

8. The long range transceiver of claim 1 further comprises a $g_m$-C filter interposed between the mixer circuit and the demodulator.

9. The long range transceiver of claim 8 further comprises an analog comparator configured to receive a filter intermediate signal from the $g_m$-C filter and generate an intermediate signal having a square waveform.

10. The long range transceiver of claim 1 wherein the demodulator, during the predefined time period, operates to count transitions between a high value and a low value in the intermediate signal and outputs the data value for the given data bit in accordance with the number of transitions counted for the given data bit.

11. The long range transceiver of claim 1 wherein the low noise amplifier is comprised on circuit having transistors operating only in subthreshold region.

12. A low power long range transceiver, comprising:
an antenna configured to receive an RF signal;
an analog front-end circuit configured to receive the RF signal from the antenna and pre-condition the RF signal by at least one of amplify the RF signal, shift frequency of the RF signal and filter the RF signal; and
a demodulator configured to receive the preconditioned signal from the analog front-end circuit and an assertion trigger signal signifying an end of a predefined time period, wherein the demodulator, during the predefined time period, operates to count transitions between a high value and a low value in the intermediate signal and, in response to the assertion trigger signal, outputs a data value for a given data bit in accordance with the number of transitions counted for the given data bit, where the predefined time period is less than a duration of a symbol time in the RF signal.

13. The long range transceiver of claim 12 further comprises a controller configured to receive the assertion trigger signal and, in response to the assertion trigger signal, disables at least one component of the transceiver, thereby reducing power consumption.

14. The long range transceiver of claim 13 wherein the controller, in response to a de-assertion trigger signal, enables the at least one component, where the de-assertion trigger signal occurs after the assertion signal and before an end of the given data bit.

15. The long range transceiver of claim 12 wherein the analog front-end circuit includes a low noise amplifier configured to receive the RF signal from the antenna and operates to amplify the RF signal; and a mixer circuit configured to receive the amplified RF signal and operates to shift the amplified RF signal to an intermediate signal having a different frequency.

16. The long range transceiver of claim 15 further comprises a phase-locked loop circuit operably coupled with the mixer circuit.

17. The long range transceiver of claim 16 wherein the phase-locked loop circuit includes a phase frequency detector, a charge pump circuit and a voltage-controlled oscillator.

18. The long range transceiver of claim 17 wherein the controller, in response to the assertion trigger signal, powers down the low noise amplifier, disables the phase frequency detector and powers down buffers and dividers of the voltage-controlled oscillator, such that the low noise amplifier is powered down before the phase frequency detector is disabled and the phase frequency detector is disabled before the buffers and dividers are powered down.

\* \* \* \* \*